(12) United States Patent
Plogmann

(10) Patent No.: US 11,215,486 B2
(45) Date of Patent: Jan. 4, 2022

(54) PRESSURE BASED FLOW SENSOR ELEMENT HAVING A PRESSURE SENSOR AND RIBS POSITIONED IN THE FLOW PASSAGE

(71) Applicant: Robert Bosch GmbH, Stuttgart (DE)

(72) Inventor: Benjamin Plogmann, Rosswaelden (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 16/500,489

(22) PCT Filed: Mar. 27, 2018

(86) PCT No.: PCT/EP2018/057780
§ 371 (c)(1),
(2) Date: Oct. 3, 2019

(87) PCT Pub. No.: WO2018/188943
PCT Pub. Date: Oct. 18, 2018

(65) Prior Publication Data
US 2021/0108950 A1 Apr. 15, 2021

(30) Foreign Application Priority Data
Apr. 11, 2017 (DE) .................. 10 2017 206 234.7

(51) Int. Cl.
*G01F 1/34* (2006.01)
*G01F 15/18* (2006.01)

(52) U.S. Cl.
CPC .............. *G01F 1/34* (2013.01); *G01F 15/185* (2013.01)

(58) Field of Classification Search
None
See application file for complete search history.

(56) References Cited

U.S. PATENT DOCUMENTS

| 4,264,961 A | * | 4/1981 | Nishimura | ............... F02D 41/26 |
| | | | | 73/204.21 |
| 4,989,456 A | | 2/1991 | Stupecky | |
| 6,647,775 B1 | * | 11/2003 | Hecht | .................... G01F 1/6842 |
| | | | | 73/202.5 |
| 7,124,626 B2 | * | 10/2006 | Lenzing | ................ G01F 1/6842 |
| | | | | 73/202 |

(Continued)

FOREIGN PATENT DOCUMENTS

| CN | 104126105 A | 10/2014 |
| DE | 102007053273 | 2/2009 |

(Continued)

OTHER PUBLICATIONS

Nternational Search Report for PCT/EP2018/057780, dated Jul. 9, 2018.

*Primary Examiner* — Harshad R Patel
(74) *Attorney, Agent, or Firm* — Norton Rose Fulbright US LLP; Gerard A. Messina

(57) ABSTRACT

A sensor element is provided for detecting at least one property of a fluid medium. The sensor element comprises at least one housing having at least one inflow opening accessible to the fluid medium. At least one pressure sensor for detecting a pressure of the fluid medium is situated in the inflow opening. In the inflow opening in front of the pressure sensor, a plurality of ribs project from at least one wall of the inflow opening into the inflow opening.

9 Claims, 3 Drawing Sheets

(56) References Cited

U.S. PATENT DOCUMENTS

| 2007/0131279 | A1 | 6/2007 | Thakre et al. | |
|---|---|---|---|---|
| 2013/0269419 | A1* | 10/2013 | Etherington | F02D 41/187 73/204.11 |
| 2014/0326064 | A1* | 11/2014 | Nakano | G01F 1/6842 73/204.26 |
| 2015/0177037 | A1* | 6/2015 | Wagner | G01F 1/6842 73/204.22 |

FOREIGN PATENT DOCUMENTS

| DE | 192010043062 | 5/2012 |
|---|---|---|
| DE | 102014212854 | 1/2016 |

* cited by examiner

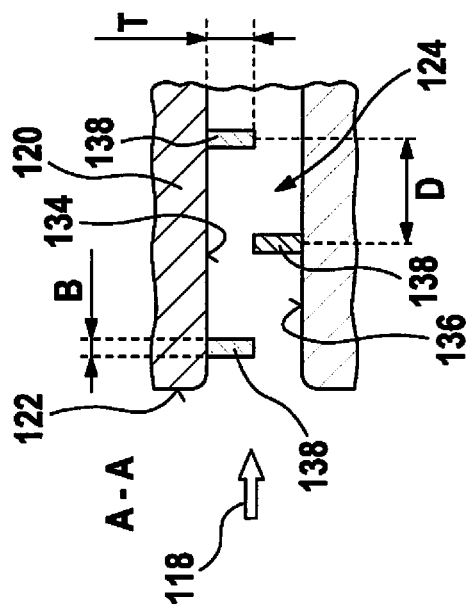
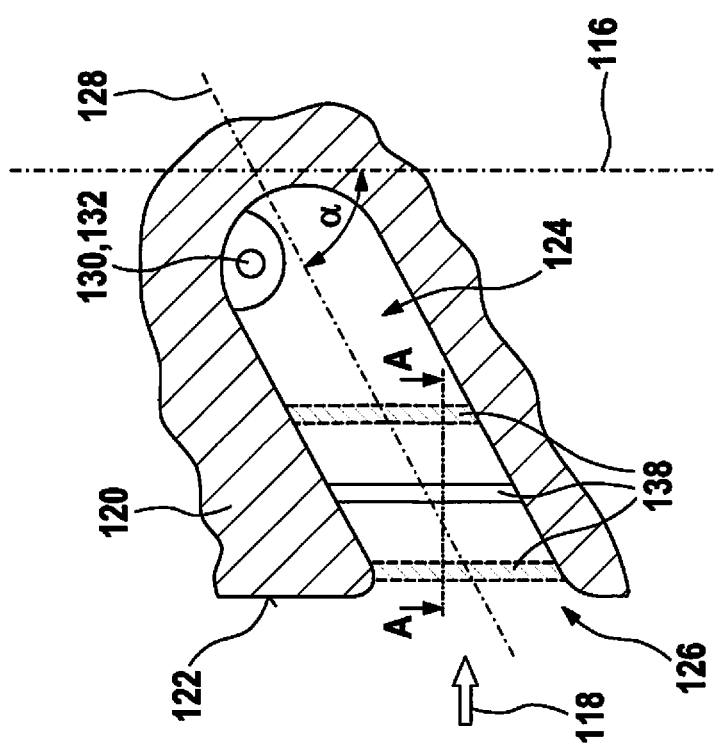
FIG. 2A
FIG. 2B

PRESSURE BASED FLOW SENSOR ELEMENT HAVING A PRESSURE SENSOR AND RIBS POSITIONED IN THE FLOW PASSAGE

BACKGROUND INFORMATION

Various kinds of sensor elements for detecting at least one property of a fluid medium are available in the related art. Without limitation of further possible restrictions, the present invention is described below with reference to pressure-based air mass meters. However, other embodiments are fundamentally also possible.

Thus, it is generally conventional, for example, to determine the air mass in air systems such as for example in the induction tract of an internal combustion engine using various measuring principles. Besides thermal measuring principles, for example in the form of hot-film air mass meters (HFM), pressure-based air mass measurements are also known, which are based on at least one pressure measurement. In this regard, the so-called Prandtl probes or Venturi tubes should be mentioned, for example. For example, for determining an air mass, which flows per unit of time through a tube, it is possible to measure a differential pressure from two static pressures or from a static pressure and an absolute pressure. It is possible to improve the accuracy of the air mass measurement in these methods for example by determining the density using additional pressure and/or temperature measurements.

German Patent Application No. DE 10 2014 212 854 A1 describes, for example, a flow rate meter for measuring a flow rate of a fluid medium flowing through a flow tube in a main flow direction. The flow rate meter comprises an impeding element that partially narrows a flow cross section, a first pressure measuring point, which is situated upstream from the impeding element with respect to the main direction of flow, and a second pressure measuring point, which is situated downstream from the impeding element with respect to the main direction of flow. The impeding element is designed to narrow the flow cross section in a variable manner.

German Patent Application No. DE 10 2007 053 273 A1 describes a flow rate meter for measuring a flow rate of a fluid medium flowing through a flow tube in a main flow direction. The flow rate meter has a plug segment having an inflow side and an outflow side. In the plug segment, an accumulation chamber is formed on the inflow side that is accessible from the inflow side through an opening. A first pressure measuring point is accommodated in a lateral wall of the accumulation chamber. A second pressure measuring point is accommodated in an outer wall of the plug segment.

In spite of the advantages achieved by conventional measuring devices, a multitude of technical challenges remain in the measurement of flow properties of fluid media. Particularly in the induction tract of internal combustion engines, it is a challenge for example to protect the sensors used against water and dirt particles and thus to avoid a false indication of the pressure sensors and an associated false indication of the air mass.

SUMMARY

In accordance with an example embodiment of the present invention, a sensor element is provided for detecting at least one property of a fluid medium. As described in more detail below, the sensor element may be embodied for example as an air mass meter, a flow rate meter, a current meter, an absolute pressure meter or a differential pressure meter. For example, the present invention may be used in one or more of the above-mentioned flow rate meters. However, other embodiments are fundamentally also possible.

The fluid medium may fundamentally be any gas or any liquid. In particular, the fluid medium may be an intake air mass of an internal combustion engine or an exhaust gas of an internal combustion engine. Accordingly, the sensor element may be used in particular in the area of automotive technology. However, other areas of application are fundamentally also possible.

The at least one property of the fluid medium may be in particular a flow property, for example a speed, a volume flow, a mass flow, a pressure, a pressure difference or another physically measurable property. However, other properties are fundamentally also possible.

The sensor element comprises at least one housing. The sensor element may be developed in particular entirely or partially as a plug sensor. Thus, the housing may for example form a plug sensor or comprise a plug sensor, which may be plugged into a flow tube of the fluid medium, for example into an induction tract of an internal combustion engine or may project into this flow tube. However, other embodiments are fundamentally also possible.

The housing comprises at least one inflow opening accessible to the fluid medium. An inflow opening is generally to be understood as an opening in the housing, into which the fluid medium is able to flow or penetrate. The opening may comprise in particular an orifice in the housing as well as a channel or channel section extending from the orifice into the housing, in particular a blind hole. If the sensor element is designed as a plug sensor, this inflow opening may be oriented in the flow tube, into which it is inserted, in particular in such a way that it points counter to the flow of the fluid medium. Accordingly, the inflow opening may be situated in particular on a front side of the plug sensor, which is oriented counter to a direction of flow of the fluid medium so that the fluid medium flows against this front side. The housing may be produced in particular entirely or partially from at least one material, selected from the group made up of plastic, metal, ceramics.

At least one pressure sensor for detecting a pressure of the fluid medium is situated in the inflow opening. As will be described in more detail below, at least one pressure tap may be located at the end of the inflow opening, which may be designed as a blind hole for example, in which pressure tap the pressure sensor is situated. The pressure sensor may be in particular at least one micromechanical pressure sensor element, for example a semiconductor sensor. Such sensors are normally based on an absolute pressure or a differential pressure deforming a diaphragm of the pressure sensor element, it being possible to measure the deformation of the diaphragm for example by piezo-sensors and/or by resistors.

In the inflow opening in front of the pressure sensor, a plurality of ribs project from at least one wall of the inflow opening into the inflow opening. Thus, the inflow opening may have for example two walls facing each other, from which, in a direction along the inflow opening, ribs alternately project into the inflow opening. The inflow opening may have, for example, a generally rectangular cross section, it being possible for longitudinal sides of the rectangular cross section to be oriented parallel to a longitudinal extension axis of the plug sensor. Accordingly, the ribs for example may protrude alternately along the inflow opening from the opposite walls into the inflow opening. Alternatively or in addition to an alternating pattern, other alternating arrangements of the ribs are also possible, however. Thus it is possible, for example, to implement a pattern in which first one rib is situated on a first wall, then again a rib on this first wall, and then a rib on an opposite, second wall. Preferably, at least one rib is situated on the first wall and at least one rib on the opposite, second wall.

A rib is to be understood generally as an elongated protrusion. The ribs themselves may have a rectangular cross section, for example. A rounded-off shape is fundamentally also possible, however.

As explained above, the ribs may be designed in particular in such a way that at least one of the ribs is situated on a first wall of the inflow opening and at least one further rib is situated on a second wall of the inflow opening opposite the first wall. The ribs may project into one another in finger-shaped fashion from opposite walls of the inflow opening in particular in a sectional plane through the inflow opening, for example in a sectional plane parallel to an axis of the inflow opening and perpendicularly to a sectional plane running through a longitudinal extension axis of the plug sensor and a direction of flow. The ribs, for example, may thus be arranged interdigitally to one another, with an overlap or without overlap. In particular, multiple ribs may be situated in offset manner with respect to one another in the direction of flow, in particular in a direction of flow along the inflow opening, for example parallel to an axis of the inflow opening, so that a flow of the fluid medium toward the pressure sensor through the inflow opening is diverted multiple times by the ribs.

The inflow opening may have in particular a cross section, the ribs in a top view onto the inflow opening, in particular in a viewing direction parallel to an axis of the inflow opening, covering 20-80% of the cross section of the inflow opening, in particular 40-60% of the cross section of the inflow opening.

As explained above, the sensor element may be selected in particular from the group made up of: an air mass meter, a flow rate meter, a current meter, an absolute pressure meter, a differential pressure meter. In addition to the pressure sensor situated in the inflow opening, the sensor element may have in particular at least one further pressure sensor. The sensor element may be set up in particular to use the pressure sensor situated in the inflow opening as an absolute pressure sensor and to use the at least one further pressure sensor as a static pressure sensor, the sensor element being furthermore set up to form a differential pressure between a signal of the absolute pressure sensor and a signal of the static pressure sensor.

As explained above, it is possible for an orifice of the inflow opening to be situated in a front side of a plug sensor, against which the fluid medium flows. The actual inflow opening may have for example a bore axis, for example a bore axis of a blind-end bore, which then, starting from the orifice of the inflow opening, may run in particular obliquely with respect to the direction of flow of the fluid medium. For example, an axis of the bore of the inflow opening together with the direction of flow may enclose an angle, which may be for example 10° to 50°, for example 20° to 45°. The sensor element in particular may have an axis, in particular a plug sensor axis, the bore axis of the inflow opening being situated at an angle α deviating from 90° with respect to the axis, in particular at an angle α of 20° to 80°, preferably of 30° to 70°, as will be explained by way of example below with reference to FIG. 2A.

The sensor element according to the present invention may have numerous advantages over conventional sensor elements. In particular, due to the design of the inflow opening comprising the ribs, it is possible effectively to protect the pressure sensor against water and dirt particles and thus effectively to prevent a false indication of the pressure sensor and for example a false indication of an air mass. Thus, for example, an absolute pressure tap may be designed in such a way that water and dirt particles are separated out and only dry air free of dirt particles reaches the pressure sensor, in particular the differential pressure sensor. One advantage of this design is that it makes it possible to avoid fundamentally a temporary false indication of pressure sensors due to water and dirt deposition. Furthermore, it is possible to avoid at least largely a permanent change in the characteristic curve of pressure sensors and thus a faulty determination of the air mass due to dirt depositions, in particular after the water has evaporated.

BRIEF DESCRIPTION OF THE DRAWINGS

Additional details and optional features of the present invention are presented in the exemplary embodiments, which are shown schematically in the figure.

FIGS. 2A and 2B show different sectional views through an inflow opening of the sensor element as shown in FIG. 1.

DETAILED DESCRIPTION OF EXAMPLE EMBODIMENTS

Figure 1:
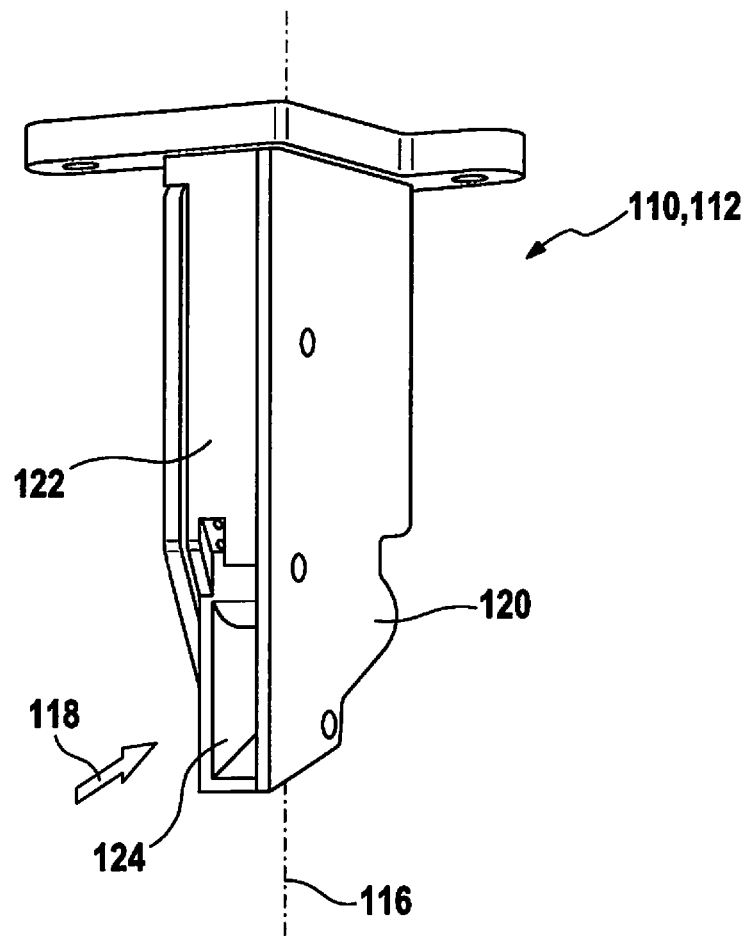
FIG. 1 shows an exemplary embodiment of a sensor element according to the present invention for detecting at least one property of a fluid medium.

FIG. 1 shows an exemplary embodiment of a sensor element 110 according to the present invention, which may be used in the exemplary embodiment in particular as a pressure-based air mass meter 112 (PFM). Sensor element 110 is designed in particular entirely or partially as a plug sensor 114 and has a plug sensor axis 116, along which plug sensor 114 projects into a fluid medium, for example in a flow channel. The fluid medium flows against plug connector 114 in a direction of flow 118.

Sensor element 110 has a housing 120, having a front side 122, against which the fluid medium flows. An inflow opening 124 is integrated in front side 122, which may have for example, as shown in FIG. 1, a rectangular cross section and through which the fluid medium is able to enter into the interior of housing 120. This inflow opening 124 is also called an inflow contour.

FIGS. 2A and 2B show different sectional views through housing 120. FIG. 2A shows a sectional view in a sectional plane, which runs parallel to plug sensor axis 116 and parallel to direction of flow 118, for example to a flow tube axis of a flow tube. FIG. 2B shows a sectional view along sectional line A-A in FIG. 2A, that is, a sectional view perpendicular to the sectional plane in FIG. 2A.

As may be seen from these sectional views, inflow opening 124 is designed in elongated fashion starting from its orifice 126 and runs obliquely to plug sensor axis 116 so that plug sensor axis 116 and an axis 128 enclose an angle α≠90°. On an end of the inflow opening opposite orifice 126, a pressure tap 130 is located, which may also be referred to or used as an absolute pressure tap. This pressure tap 130 comprises at least one pressure sensor 132, which may be situated for example in a blind-end bore perpendicularly to the drawing plane in FIG. 2A and which is accordingly reachable for example by the fluid medium, which flows into inflow opening 124.

Ribs 138 protrude from opposite lateral walls 134, 136 of inflow opening 124. These ribs extend preferably across the entire height of inflow opening 124 in FIG. 2A and are situated preferably in alternating fashion on opposite lateral walls 134, 136, as may be seen particularly in FIG. 2B. The ribs have a rib width B, a rib spacing D as well as a rib depth T, by which the ribs protrude into the inflow opening. The rib width B may be 1 to 3 mm, for example. The rib spacing D may be 5 to 15 mm, for example. The rib depth T may be designed for example in such a way that it amounts to 20%-80% of the spacing between lateral walls 134 and 136, i.e., of the entire width of inflow opening 124.

The ribs 138 serve to protect pressure sensor 132 against water and dirt deposits. The ribs cover, each by itself, preferably 40-60% of the cross section of inflow opening 124. Ribs 138 are arranged in offset fashion in the direction of flow, as a result of which the flow is diverted multiple times up to pressure tap 130. Due to their inertia, water and dirt particles are normally not able to follow the diversion and consequently strike upon ribs 138. It is thus possible to protect pressure tap 130 and thus pressure sensor 132 against water and dirt particles.

In order to optimize the effect of ribs 138, it is possible to reduce the spacing D between adjacent ribs 138. Alternatively or additionally, it is possible to increase the depth T of the ribs. Again, alternatively or in addition to one or both of the mentioned measures, it is possible to increase the width B of the ribs, and/or an increased number of ribs 138 may be provided.

Figure 3:
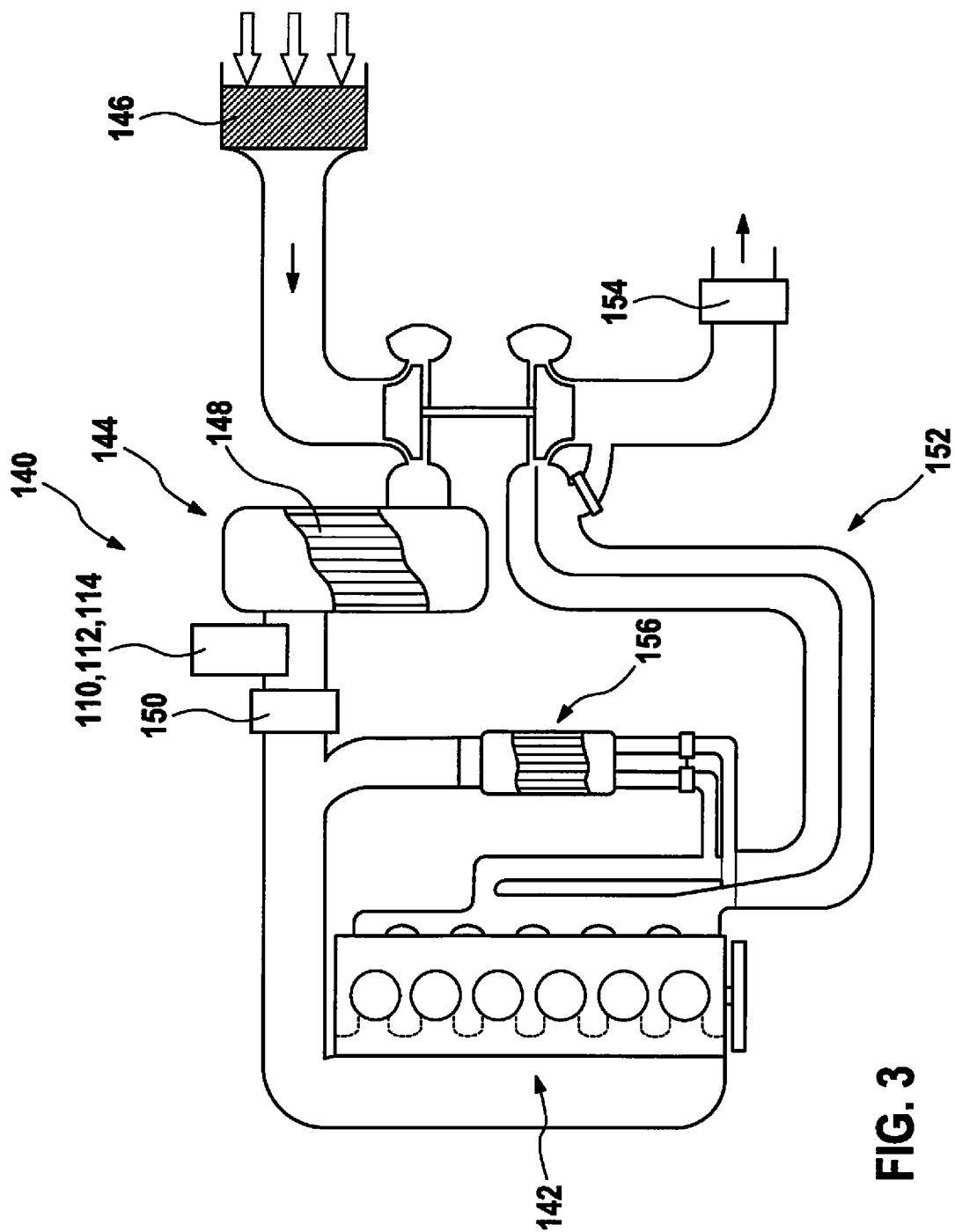
FIG. 3 show a schematic illustration of an air system of an internal combustion engine including the sensor element of the invention situated between an intercooler and a throttle valve.

Sensor element 110, for example the plug sensor 114 as shown in FIGS. 1, 2A and 2B, may be situated in an air system 140 of an internal combustion engine 142 for example, which is schematically shown in FIG. 3. As may be seen in FIG. 3, this air system 140 comprises an induction tract 144 having an air filter 146, an intercooler 148 and a throttle valve 150 as well as an exhaust tract 152 having an exhaust flap 154. Furthermore, an exhaust-gas recirculation system 156 may be optionally provided. Sensor element 110 may be situated for example between intercooler 148 and throttle valve 150 and may be designed for example as a pressure-based air mass meter (PFM) 112.

What is claimed is:

1. A sensor element for detecting at least one property of a fluid medium, comprising:
    at least one housing having at least one inflow opening accessible to the fluid medium;
    at least one pressure sensor situated in the inflow opening configured to detect a pressure of the fluid medium;
    wherein, in the inflow opening in front of the pressure sensor, a plurality of ribs project from at least one wall of the inflow opening into the inflow opening, wherein multiple ribs of the plurality of ribs are arranged in an offset manner with respect to one another in a direction of flow so that a flow of the fluid medium toward the pressure sensor is diverted multiple times by the ribs, and wherein no longitudinal axis of a first one of the multiple ribs is collinear with a longitudinal axis of any other one of the multiple ribs.

2. The sensor element as recited in claim 1, wherein the sensor element is a plug sensor.

3. The sensor element as recited in claim 1, wherein at least one rib of the plurality of ribs is situated on a first wall of the inflow opening, and at least one further rib of the plurality of ribs is situated on a second wall of the inflow opening that is opposite to the first wall.

4. The sensor element as recited in claim 1, wherein the ribs, in a sectional plane through the inflow opening, project in finger-shaped fashion into one another from opposite walls of the inflow opening.

5. The sensor element as recited in claim 1, wherein the inflow opening has a cross section, the ribs covering 20-80% of the cross section of the inflow opening.

6. The sensor element as recited in claim 1, wherein the sensor element is one of: an air mass meter, or a flow rate meter, or a current meter, or an absolute pressure meter, or a differential pressure meter.

7. The sensor element as recited in claim 1, wherein the pressure sensor situated in the inflow opening is an absolute pressure sensor, and wherein the sensor element is configured as a differential pressure between a signal of the absolute pressure sensor and a signal of the static pressure sensor.

8. The sensor element as recited in claim 1, wherein the inflow opening is situated obliquely with respect to a direction of flow of the fluid medium.

9. The sensor element as recited in claim 1, wherein the sensor element has an axis, the inflow opening being situated at an angle deviating from 90° with respect to the axis.

* * * * *